(12) United States Patent  (10) Patent No.: US 8,599,019 B2
Nagamura et al.  (45) Date of Patent: Dec. 3, 2013

(54) ANTITHEFT DEVICE AND INTERFACE DEVICE PROVIDED WITH THE SAME

(75) Inventors: Yoshiaki Nagamura, Osaka (JP); Richard Hsu, Secaucus, NJ (US)

(73) Assignee: Panasonic Corporation, Osaka (JP)

( * ) Notice: Subject to any disclaimer, the term of this patent is extended or adjusted under 35 U.S.C. 154(b) by 346 days.

(21) Appl. No.: 13/019,820

(22) Filed: Feb. 2, 2011

(65) Prior Publication Data

US 2011/0191864 A1    Aug. 4, 2011

(30) Foreign Application Priority Data

Feb. 4, 2010    (JP) ................................ 2010-023261

(51) Int. Cl.
*G08B 13/14*    (2006.01)
(52) U.S. Cl.
USPC ........................................ 340/568.1; 70/58
(58) Field of Classification Search
USPC ............ 70/57, 58; 361/683; 340/568.1, 568.2
See application file for complete search history.

(56) References Cited

U.S. PATENT DOCUMENTS

| | | | |
|---|---|---|---|
| 5,381,685 A * | 1/1995 | Carl et al. | 70/58 |
| 5,959,835 A | 9/1999 | Dohi et al. | |
| 5,995,366 A * | 11/1999 | Howell et al. | 70/57 |
| 6,061,233 A * | 5/2000 | Jung | 70/58 |
| 6,189,349 B1 * | 2/2001 | Helot et al. | 70/58 |
| 7,298,611 B1 * | 11/2007 | Carnevali | 70/58 |
| 2004/0177658 A1 * | 9/2004 | Mitchell | 70/58 |
| 2004/0261474 A1 * | 12/2004 | Galant | 70/58 |
| 2007/0177347 A1 | 8/2007 | Nishiyama | |
| 2009/0027849 A1 | 1/2009 | Tanaka | |

FOREIGN PATENT DOCUMENTS

| | | |
|---|---|---|
| JP | 2650147 | 9/1997 |
| JP | 09-265334 | 10/1997 |
| JP | 10-171552 | 6/1998 |
| JP | 2007-206900 | 8/2007 |
| JP | 2009-026234 | 2/2009 |
| WO | WO 93/15295 A1 | 8/1993 |

\* cited by examiner

*Primary Examiner* — Thomas Mullen
(74) *Attorney, Agent, or Firm* — Hamre, Schumann, Mueller & Larson, P.C.

(57) ABSTRACT

By attaching a connector 16 to an interface device connector 105, engaging a hook member 17 in a security slot 106, and attaching a security cable 30 to a first security slot 21, displacement of a link bar 19 is regulated by a head portion 32 of the security cable 30 and displacement of the connector 16 and the hook member 17 can be regulated. Since a computer 100 and an interface device 10 can be protected against theft by the single security cable, they can be shifted to the locked state with ease.

5 Claims, 13 Drawing Sheets

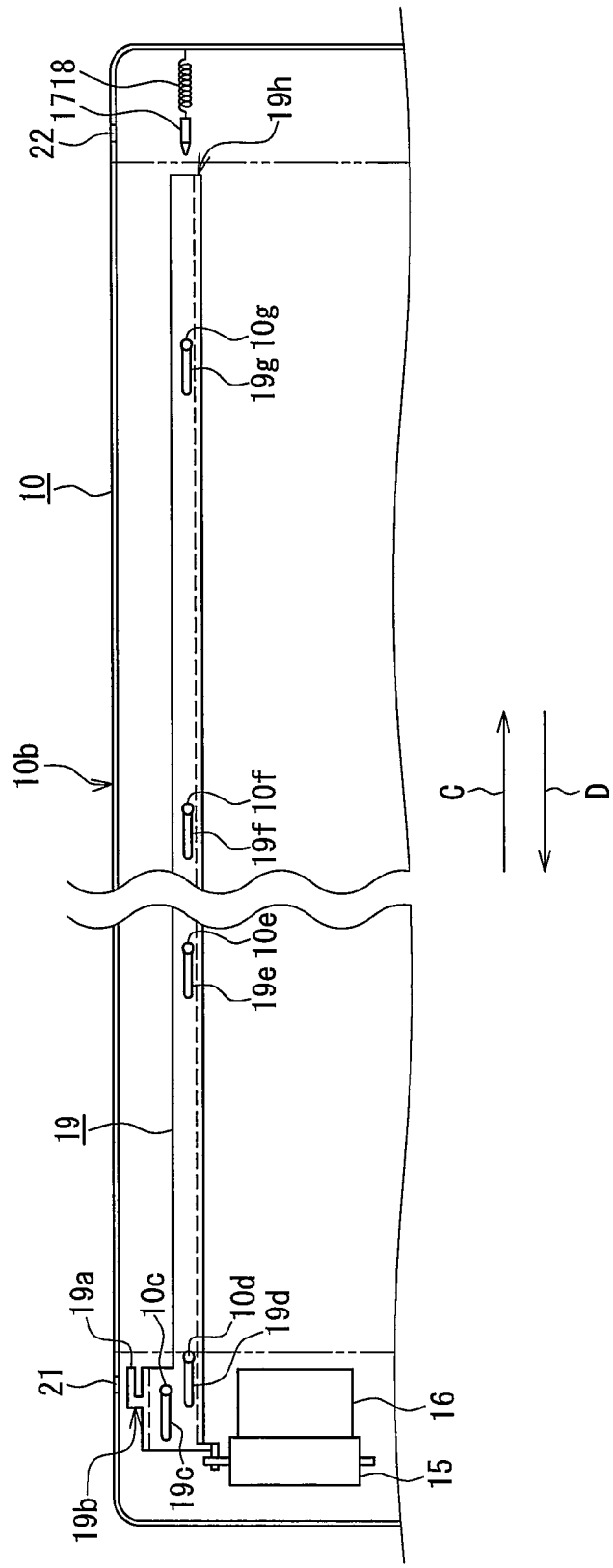

ANTITHEFT DEVICE AND INTERFACE DEVICE PROVIDED WITH THE SAME

BACKGROUND OF INVENTION

1. Field of the Invention

The present application relates to an antitheft device and an interface device provided with the antitheft device.

2. Description of Related Art

Conventionally, computers are often provided with locking holes (security slots) for a theft-prevention purpose. Further, interface devices and peripheral devices also are often provided with locking security slots. Japanese Patent No. 2,650,147 discloses a theft-prevention method using security slots. Specifically, Japanese Patent No. 2,650,147 discloses that a computer and a peripheral device can be protected against theft by attaching one end of antitheft devices (security cables) to a fixture and attaching the other end of the antitheft devices to security slots to fix the computer and the peripheral device to the fixture.

The method disclosed in Japanese Patent No. 2,650,147 involves the following problem. To protect both the computer and the interface device against theft by this method, it is necessary to attach security cables to the computer and the interface device, respectively. Therefore, it is necessary for both the computer and the interface device to carry out the complex operation of putting each security cable at a given location and locking each cable with a key.

SUMMARY OF THE INVENTION

The antitheft device disclosed in the present application is an antitheft device provided for a peripheral device to/from which an electronic device can be attached/detached. The antitheft device includes: a first hole to/from which a security cable can be attached/detached; an attachment/detachment operation portion; a link member that can be displaced between a first position and a second position in response to an operation of the attachment/detachment operation portion; and an engagement means that regulates detachment of the electronic device from the peripheral device when the link member is at the first position and does not regulate the detachment when the link member is at the second position. The link member includes a displacement regulating means at a position where the displacement regulating means can come into contact with the security cable to regulate displacement of the link member to the second position when the security cable is attached to the first hole and the link member is at the first position.

The interface device disclosed in the present application is an interface device attachable to and detachable from an electronic device. The interface device includes: a first hole to/from which a security cable can be attached/detached; an attachment/detachment operation portion; a link member that can be displaced between a first position and a second position in response to an operation of the attachment/detachment operation portion; and an engagement means that regulates detachment of the electronic device from the interface device when the link member is at the first position and does not regulate the detachment when the link member is at the second position. The link member includes a displacement regulating means at a position where the displacement regulating means can come into contact with the security cable to regulate displacement of the link member to the second position when the security cable is attached to the first hole and the link member is at the first position.

BRIEF DESCRIPTION OF THE DRAWINGS

FIG. 5 is a plan view showing the internal configuration of the interface device according to one embodiment.

DETAILED DESCRIPTION OF THE EMBODIMENT

Embodiment

[1. Configuration of Interface Device]

Figure 1:
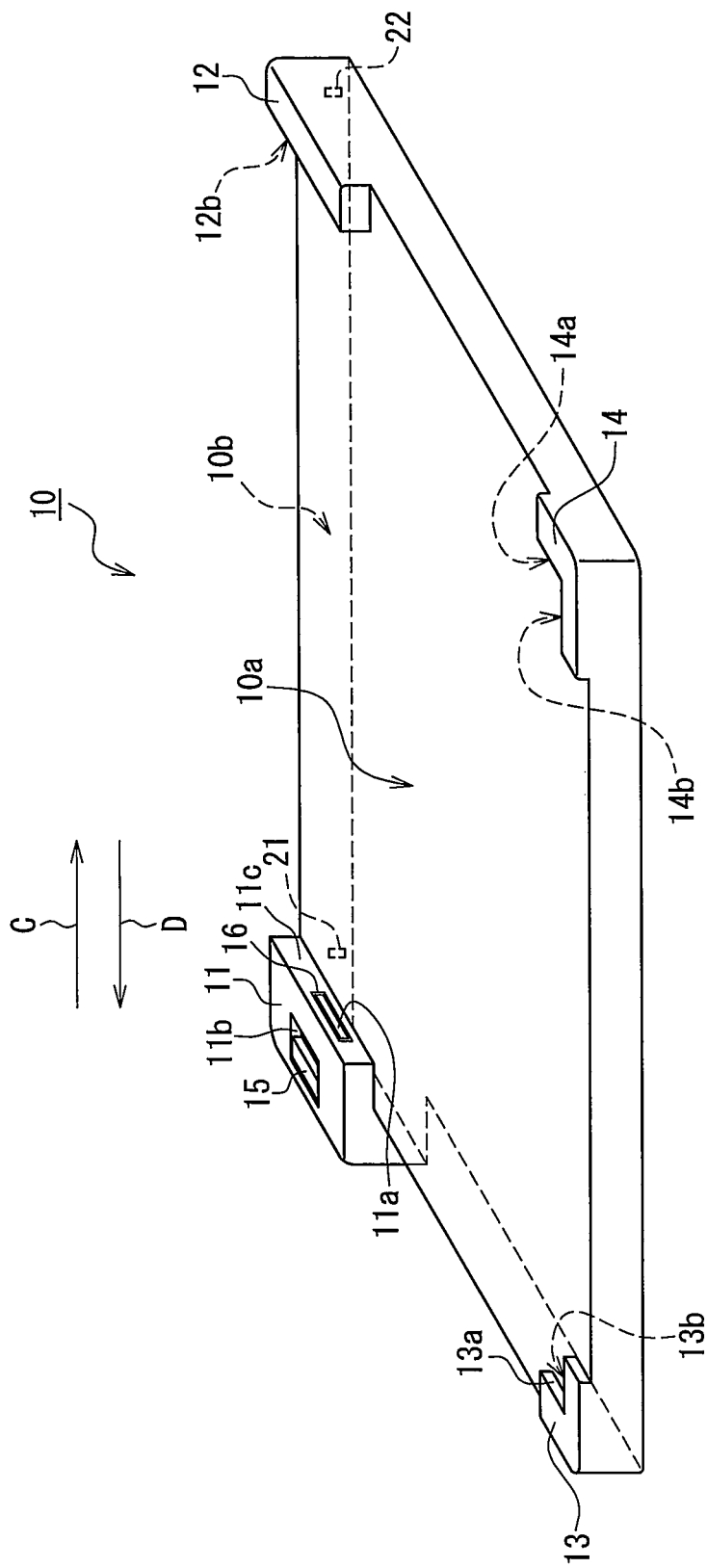
FIG. 1 is a perspective view of an interface device according to one embodiment.
Figure 2:
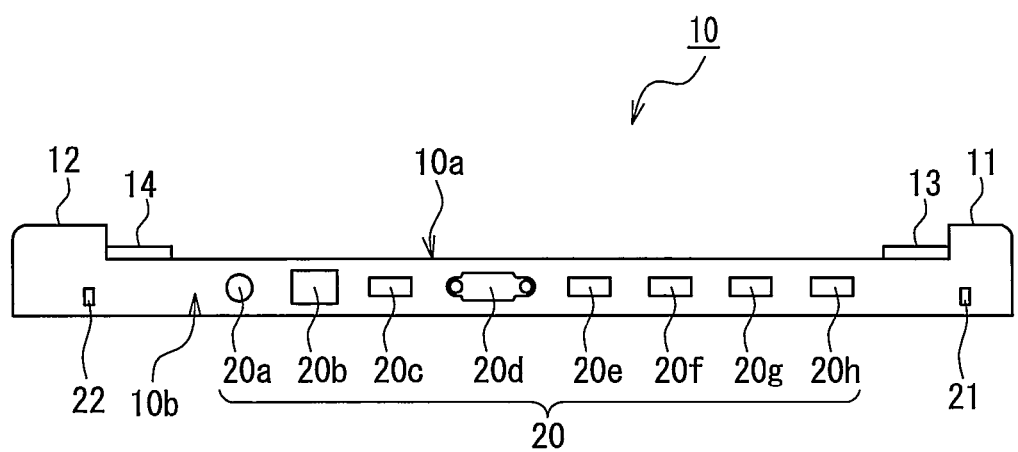
FIG. 2 is a side view showing the configuration of the back of the interface device according to one embodiment.
Figure 3:
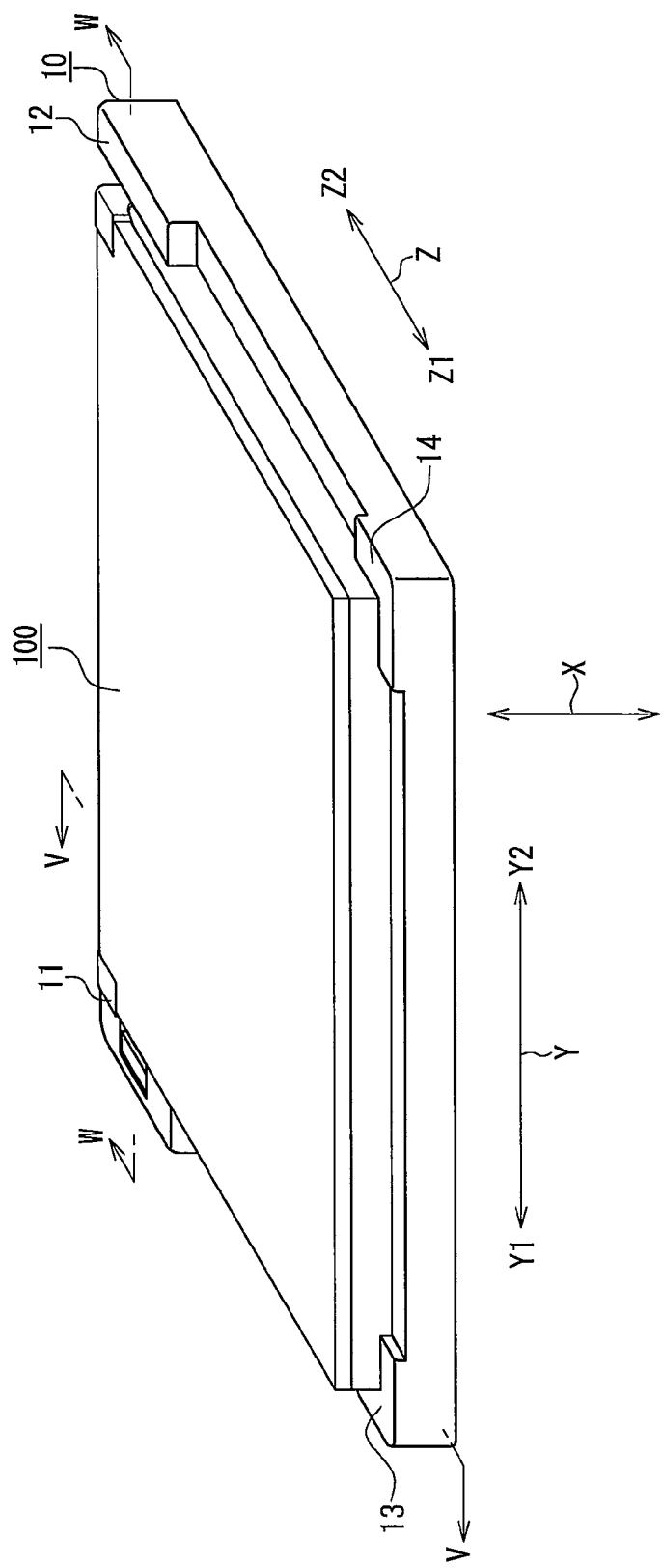
FIG. 3 is a perspective view of the interface device and a computer according to one embodiment.

FIG. 1 is a perspective view of an interface device according to one embodiment. FIG. 2 is a side view showing the configuration of the back of the interface device according to one embodiment. FIG. 3 is a perspective view of the interface device according to one embodiment to which a laptop computer is attached.

In the description of the present embodiment, "placing a computer on an interface device" means that the computer is placed on the top face of the interface device and the computer is detachable from the interface device. In this specification, the state in which the computer is placed on the interface device also may be referred to as an "unlocked state." On the other hand, "attaching the computer to the interface device" means that the computer is brought to a state where it is not detachable from the interface device. A "locked state" refers to a state in which the computer is attached to the interface device, one end of a security cable is fixed to a fixture, and the other end of the security cable is attached to the interface device. In this specification, the locked state also may be referred to as a "theft-prevention state." "Attaching the security cable" means that the security cable is brought to a state where it is fixed the interface device or the like. "Inserting the security cable" means that the security cable is to be inserted into a security slot provided for the interface device or the like and the security cable is detachable from the security slot.

As shown in FIG. 1, an interface device 10 includes a thin housing. The interface device 10 includes a first raised portion 11, a second raised portion 12, a third raised portion 13, and a fourth raised portion 14 respectively at the four corners of a top face 10a or in the vicinity of the four corners. The first raised portion 11, the second raised portion 12, the third raised portion 13 and the fourth raised portion 14 are raised from the top face 10a. The top face 10a is a surface on which a computer 100 (see FIG. 3) can be placed. FIG. 3 shows a state in which the computer 100 is placed on the top face 10a. The top face 10a at least has a shape and an area that allow the computer 100 to be placed on the top face 10a.

The first raised portion 11 includes a hole 11a and a concave portion 11b. The first raised portion 11 is provided with a slide lever 15 and a connector 16. The slide lever 15 is partially exposed at the concave portion 11b. Inside the first raised portion 11, the slide lever 15 is connected to the connector 16. The slide lever 15 is slidable in the direction indicated by the arrow C or D. By sliding the slide lever 15 in the direction indicated by the arrow C, it is possible to displace the connector 16 from a stored position at which the connector 16 is located within the first raised portion 11 to a protruding position at which the connector 16 partially sticks out from the hole 12a. By sliding the slide lever 15 in the direction indicated by the arrow D, it is possible to displace the connector 16 from the protruding position at which the connector 16 partially sticks out from the hole 12a to the stored position at which the connector 16 is located within the first raised portion 11. The connector 16 includes an electric contact (detailed configuration not shown) electrically connectable to an interface device connector 105 (described later) of the computer 100 (see FIG. 3). Further, a regulating surface 11c of the first raised portion 11 is a surface for regulating the position of the computer 100 placed on the top face 10a.

The second raised portion 12 includes a hole 12a (described later) formed in a regulating surface 12b opposing the first raised portion 11. Note that the regulating surface 12b is a surface for regulating the position of the computer 100 placed on the top face 10a.

The third raised portion 13 includes regulating surfaces 13a and 13b. The regulating surfaces 13a and 13b are surfaces for regulating the position of the computer 100 placed on the top face 10a. The regulating surfaces 13a and 13b are adjacent to each other. Although the regulating surfaces 13a and 13b form, for example, a right angle in the present embodiment, they may form another angle as long as they can regulate the position of the computer 100. The regulating surfaces 13a and 13b may be disposed apart from each other as long as they can regulate the position of the computer 100.

The fourth raised portion 14 includes regulating surfaces 14a and 14b. The regulating surfaces 14a and 14b are surfaces for regulating the position of the computer 100 placed on the top face 10a. The regulating surfaces 14a and 14b are adjacent to each other. Although the regulating surfaces 14a and 14b form, for example, a right angle, they may form another angle as long as they can regulate the position of the computer 100. The regulating surfaces 14a and 14b may be disposed apart from each other as long as they can regulate the position of the computer 100.

The regulating surfaces 13a and 14a oppose each other, and in the present embodiment, they are parallel to each other. As long as the regulating surfaces 13a and 14a can regulate the position of the computer 100, they are not required to be parallel to each other. The regulating surfaces 13b and 14b are on the same plane. As long as the regulating surfaces 13b and 14b can regulate the position of the computer 100, they are not required to be on the same plane.

As shown in FIG. 2, a terminal portion 20, a first security slot 21, and a second security slot 22 are provided on the back face 10b of the interface device 10.

The terminal portion 20 includes a power port 20a, a LAN (Local Area Network) port 20b, a digital display port 20c, an analog display port 20d, and USB (Universal Serial Bus) ports 20e to 20h. To each port included in the terminal portion 20, a corresponding cable or the like can be connected. Each port included in the terminal portion 20 and the connector 16 is connected electrically to wiring and an electric circuit board in the interface device 10. That is, by attaching the computer 100 to the interface device 10, connecting the connecter 16 to the interface device connector 105 (described later), and connecting a cable to any of the ports included in the terminal portion 20, the cable and the computer 100 can be connected to each other electrically.

For example, the first security slot 21 and the second security slot 22 are slots to which the security cables disclosed in Japanese Patent No. 2,650,147 can be attached, and they are each composed of a substantially rectangular through hole. For the size and shape of the first security slot 21 as well as the second security slot 22, the specifications disclosed in Japanese Patent No. 2,650,147 can be adopted. The first security slot 21 and the second security slot 22 have the same size and the same shape. Security cables can be attached to the first security slot 21 and the second security slot 22, respectively. In this case, the effect of protecting the interface device 10 against theft increases further. Although how to attach/detach a security cable to/from the first security slot 21 and the second security slot 22 and how to lock/unlock the security cable will be described later, Japanese Patent No. 2,650,147 also discloses examples thereof. By attaching a security cable to at least one of the first security slot 21 and the second security slot 22, and fixing the other end of the security cable to a fixture, the interface device 10 becomes fixed to the fixture (theft-prevention state). The first security slot 21 is a slot that allows the following. By attaching, to the first security slot 21, one end of the security cable whose other end is fixed to the fixture, the interface device 10 and the computer 100 (discussed later) can be brought to the locked state. The second security slot 22 is a slot that allows the following. By attaching, to the second security slot 22, one end of the security cable whose other end is fixed to the fixture, only the interface device 10 can be brought to the locked state.

As shown in FIG. 3, when the computer 100 is placed on the top face 10a of the interface device 10, the regulating surfaces 11c, 12b, 13a and 14a (see FIG. 1) regulate the position of the computer 100 in the Y-axis direction. The regulating surfaces 13b, 14b (see FIG. 1) regulate the position of the computer 100 in the direction indicated by the arrow Z1. By connecting the connector 16 (see FIG. 1) to the interface device connector 105 (described later) and engaging a hook member 17 (described later) in a security slot 106 (described later) provided for the computer 100, the position of the computer 100 in the X-axis and Z-axis directions is regulated.

Figure 4:
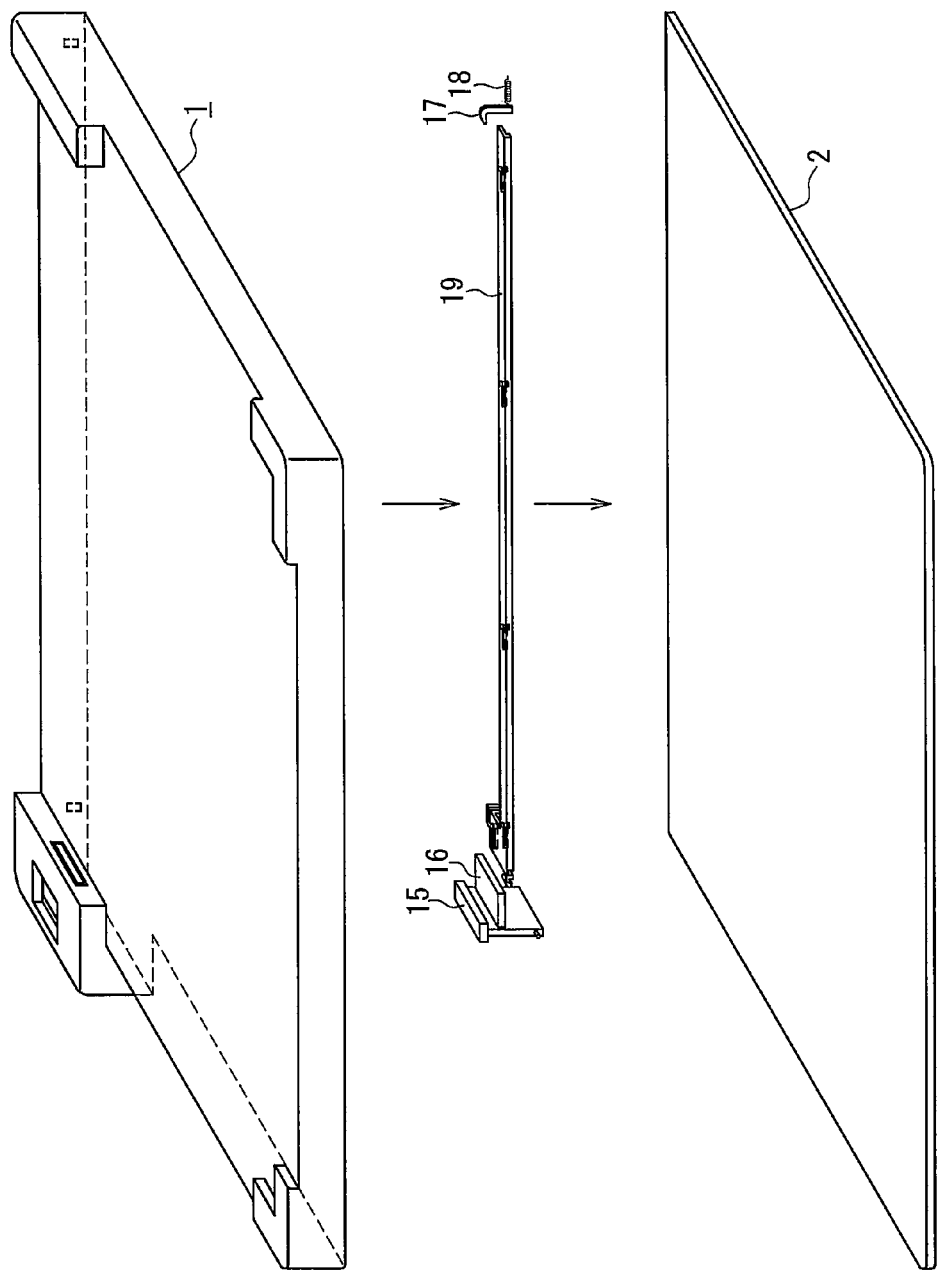
FIG. 4 is an exploded perspective view of the interface device according to one embodiment.

FIG. 4 is an exploded perspective view of the interface device 10. FIG. 5 is a plan view in the vicinity of a link bar 19.

As shown in FIG. 4, the interface device 10 is composed primarily of a housing 1, a base plate 2, the slide lever 15, the connector 16, the hook member 17, a spring 18 and the link bar 19. The first housing 1 is formed integrally with the first raised portion 11, the second raised portion 12, the third raised portion 13, and the fourth raised portion 14. By connecting the base plate 2 to the housing 1, a space can be formed. The slide lever 15, the connector 16, the hook member 17, the spring 18 and the link bar 19 are disposed within the space formed by the housing 1 and the base plate 2. The housing 1 and the base plate 2 can be connected to each other by known connecting members such as screws and hooks. The housing 1 and the base plate 2 preferably are connected to each other in such a manner that they are not easily separable from each other. The housing 1 and the baseplate 2 preferably are made of a material capable of withstanding the weight of the computer 100. Further, the housing 1 and the base plate 2 preferably are formed in shape and thickness that allow the housing 1 and the base plate 2 to withstand the weight of the computer 100.

The slide lever 15, the connector 16 and the link bar 19 are coupled to each other. Therefore, by sliding the slide lever 15 in the direction indicated by the arrow C or D in FIG. 1, the positions of the connector 16 and the link bar 19 relative to the first raised portion 11 change. The slide lever 15 is supported against the inner surface of the housing 1 slidably in the direction indicated by the arrow C or D in FIG. 1 (supporting structure not shown).

The link bar 19 is made of long sheet metal.

As shown in FIG. 5, the link bar 19 is supported against the inner surface of the housing 1 by screws 10d to 10g so that it can be displaced. Specifically, the screws 10d to 10g pass through corresponding long holes 19d to 19g formed in the link bar 19 and engage with the inner surface of the housing 1. Thus, the link bar 19 is guided by the screws 10d to 10g and the long holes 19d to 19g and can be displaced in the direction indicated by the arrow C or D. The components for supporting the link bar 19 are not limited to the screws, and those that at least can be fitted movably to the long holes 19d to 19g may be used. For example, cylindrical protrusions formed integrally with the housing 1 on its inner surface may be used as the components for supporting the link bar 19.

The slide lever 15 is coupled to one end of the link bar 19 in the longitudinal direction. The other end of the link bar 19 in the longitudinal direction is located in the vicinity of the hook member 17 or is in contact with the hook member 17. As shown in FIG. 5, the link bar 19 includes a bent portion 19a in the vicinity of the first security slot 21. The bent portion 19a is a part of the link bar 19 that sticks out from near the long hole 19c towards the first security slot 21 and is bent in the direction of the hook member 17 in parallel with the long hole 19c in its longitudinal direction. When the link bar 19 is displaced in the direction indicated by the arrow D and is located as shown in FIG. 5, the bent portion 19a opposes the first security slot 21. When the link bar 19 is displaced in the direction indicated by the arrow C and is located in that direction, the bent portion 19a does not oppose the first security slot 21.

The hook member 17 is supported rotatably against the inner surface of the housing 1 (supporting structure will be described later). The hook member 17 rotates about substantially the center of its longitudinal direction. The hook member 17 includes a hook 17c (described later) at one of its ends in the longitudinal direction. The other end of the link bar 19 in the longitudinal direction is located in the vicinity of or in contact with the other end face 19h of the hook member 17 in the longitudinal direction. The hook member 17 is biased by the spring 18 such that the hook 17c is located within the second raised portion 12.

[2. Configuration of Computer 100]

Figure 6A:
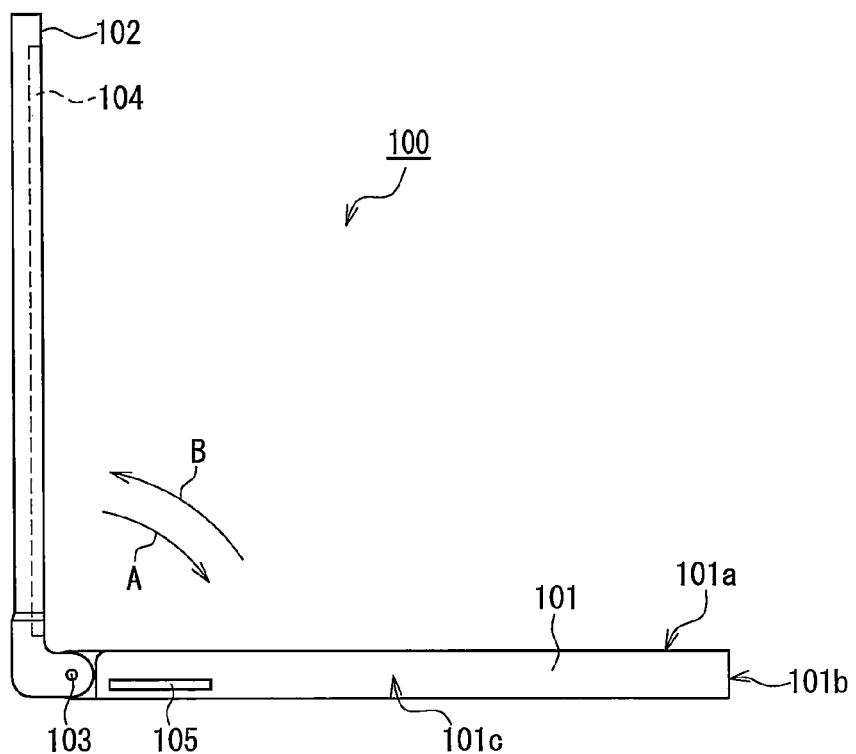
FIG. 6A is a side view of the left side of the computer.
Figure 6B:
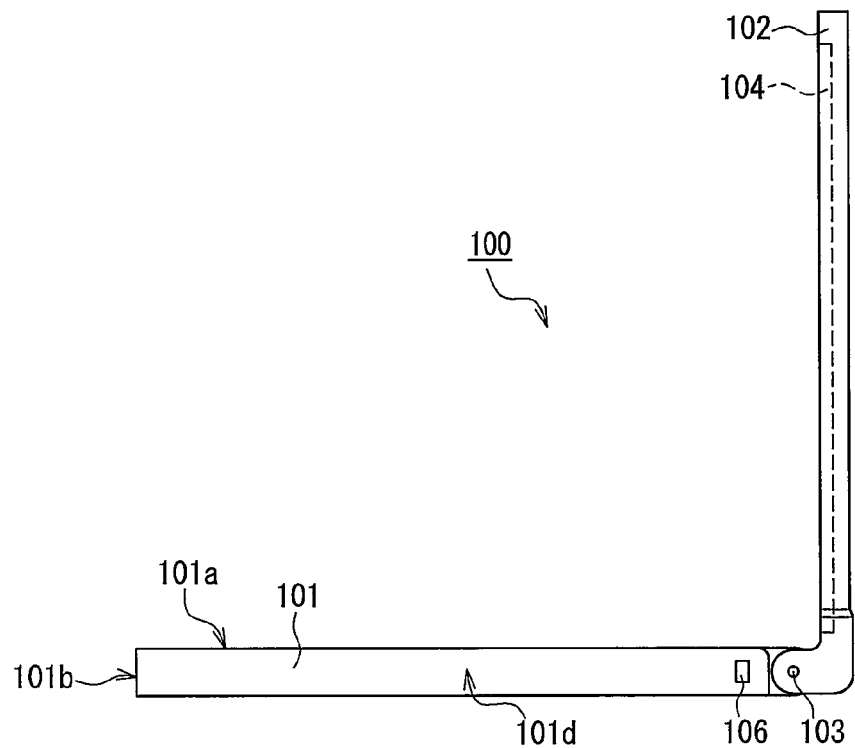
FIG. 6B is a side view of the right side of the computer.

FIG. 6A is a side view of the left side of the computer 100. FIG. 6B is a side view of the right side of the computer 100.

The computer 100 includes a first housing 101 and a second housing 102. The first housing 101 and the second housing 102 are supported by spindles 103 rotatably in the direction indicated by the arrow A or B. Although the computer 100 in the present embodiment is a compact laptop computer, it may be a portable computer composed of a single housing. Further, to the interface device according to the present embodiment, it is possible to connect not only computers but also electronic devices that are at least portable and attached to the interface device for carrying our data communication or charging the internal battery. Examples of such electronic devices include a PDA (Personal Digital Assistant), a portable game machine, and a portable medical device.

For example, the first housing 101 includes, among others, a keyboard and an electric circuit board on which a central processing unit (CPU), a memory and the like are mounted. The second housing 102 includes a liquid crystal display 104.

As shown in FIG. 6A, the interface device connector 105 is provided on the left side face 101c of the first housing 101. The interface device connector 105 is connectable to the connector 16 (see FIG. 1) provided for the interface device 10 and includes an electric contact electrically connectable to the electric contact of the connector 16. The interface device connector 105 is placed on the left side face 101c at a position where the connector 16 can be connected to the connector 105 when the computer 100 is attached to the interface device 10 at the correct position as shown in FIG. 3.

As shown in FIG. 6B, a security slot 106 is provided on the right side face 101d of the first housing 101. For example, the security slot 106 is a slot to which the security cable disclosed in Japanese Patent No. 2,650,147 can be attached and is composed of a substantially rectangular through hole. For the size and shape of the security slot 106, the specifications disclosed in Japanese Patent No. 2,650,147 can be adopted. Japanese Patent No. 2,650,147 discloses how to attach/detach the security cable to/from the security slot 106 and how to lock/unlock the security cable. In the present embodiment, the security cable can be attached to and detached from the security slot 106 based on the details of the disclosure. By attaching the security cable to the security slot 106 and fixing the other end of the security cable to a fixture, the computer 100 can be fixed to the fixture (theft-prevention state). The security slot 106 at least has a size that allows the hook member 17 to engage in the security slot 106. The security slot 106 is formed in the right side face 101d of the first housing 101 at a position where the hook member 17 can engage in the security slot 106 when the computer 100 is attached to the interface device 10 at the correct position as shown in FIG. 3.

[3. Locking]

Figure 7A:
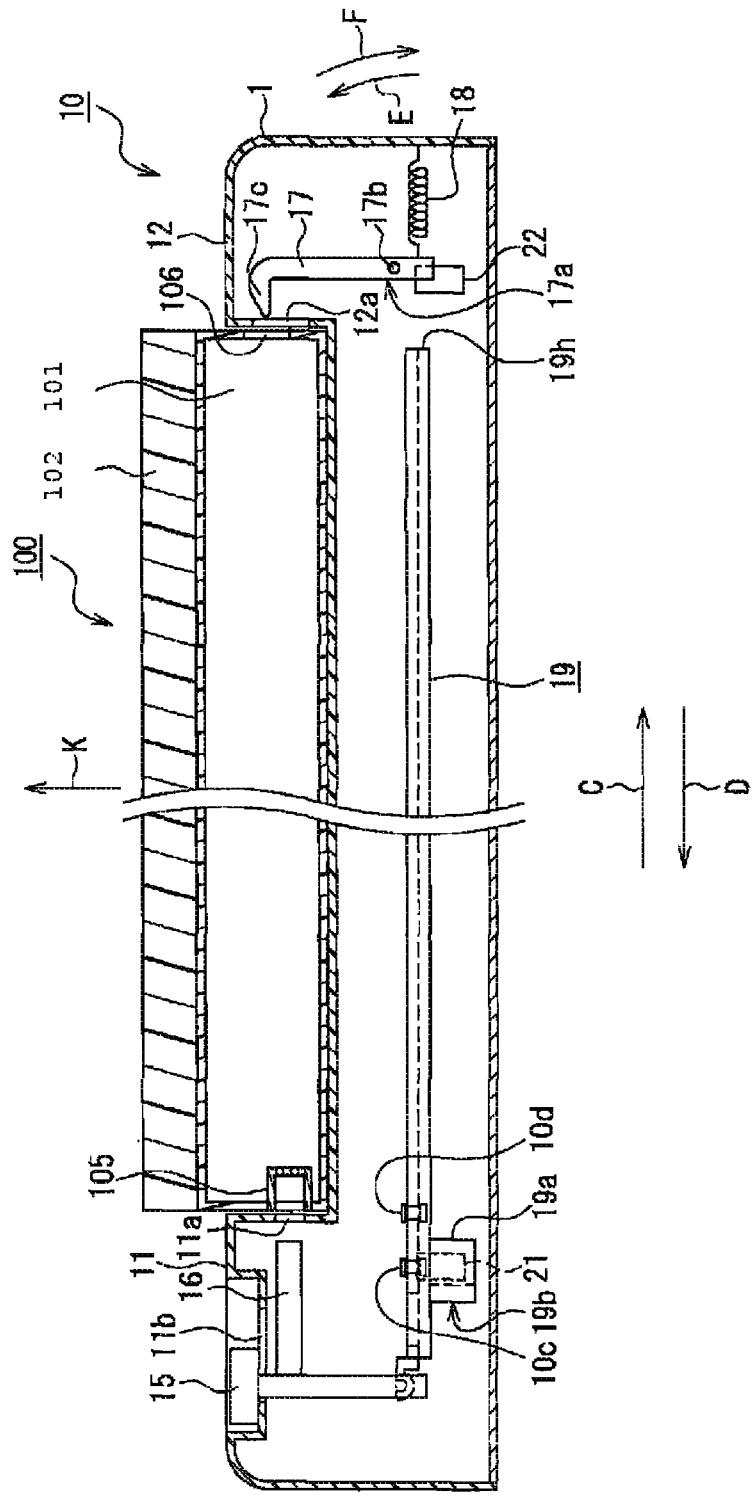
FIG. 7A is a cross-sectional view taken along the W-W portion in FIG. 3 (unlocked state).
Figure 7B:
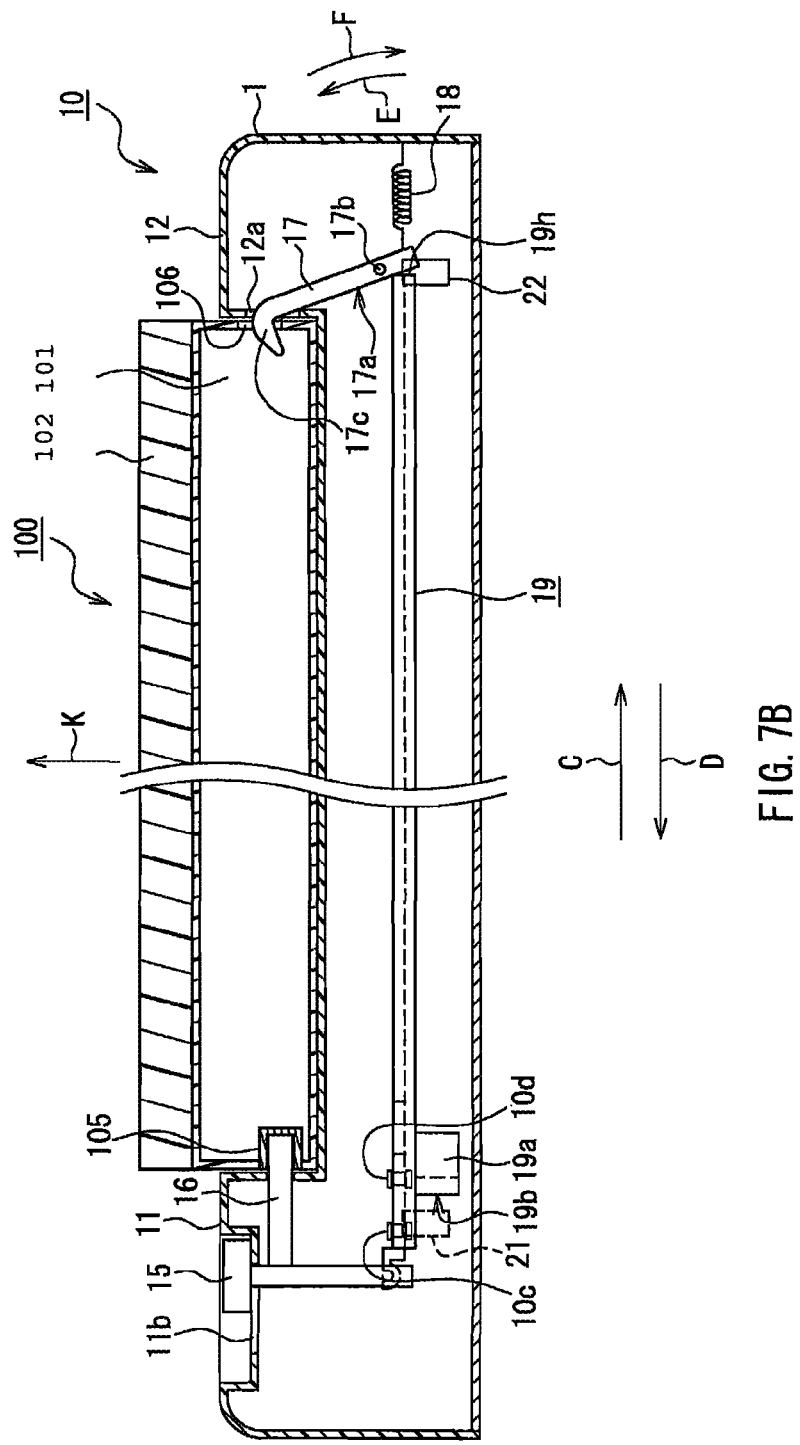
FIG. 7B is a cross-sectional view taken along the W-W portion in FIG. 3 (locked state).

FIG. 7A is a cross-sectional view of the computer 100 being placed on the interface device 10. FIG. 7B is a cross-sectional view of the computer 100 being attached to the interface device 10. FIGS. 7A and 7B are cross-sectional views taken along the W-W portion in FIG. 3. Note that the positions at which the slide lever 15, the connector 16, the hook member 17, the spring 18 and the link lever 19 are located respectively in the state shown in FIG. 7A are referred to as "unlocked positions." Further, the positions at which the slide lever 15, the connector 16, the hook member 17, the spring 18 and the link lever 19 are located respectively in the state shown in FIG. 7B are referred to as "locked positions."

Steps to be taken when attaching the computer 100 to the interface device 10 will be described. When attaching the computer 100 to the interface device 10, cables may have been connected to the respective ports included in the terminal portion 20 or may be connected to the respective ports after the attachment of the computer 100 to the interface device 10. Further, the security cable preferably is detached from the first security slot 21 when attaching the computer 100 to the interface device 10. As for the attachment of the security cable to the second security slot 22, it can be carried out before or after the attachment of the computer 100 to the interface device 10.

As shown in FIG. 7A, first, the slide lever 15 is displaced in the direction indicated by the arrow D. As a result, the connector 16 becomes located within the raised portion 11. Further, the link bar 19 is guided by the screws 10c to 10g and the long holes 19c to 19g and is displaced in the direction indicated by the arrow D. Further, the end face 19h is spaced from the hook member 17. By separating the hook member 17 from the end face 19h, the hook member 17 is biased in the direction indicated by the arrow D by the spring 18. As a result of being biased in the direction indicated by the arrow D by the spring 18, the hook member 17 is rotated in the direction indicated by the arrow F about the spindle 17b, so that the hook 17c becomes located within the second raised portion 12 as shown in FIG. 7A. Consequently, the connector 16 does not stick out from the first raised portion 11 and the hook member 17 does not stick out from the second raised portion 12.

Next, as shown in FIG. 7A, the computer 100 is placed on the top face 10a of the interface device 10. At this time, as shown in FIGS. 1 and 3, the computer 100 is placed at a position where the left side face 101c (see FIG. 6A) opposes the regulating surfaces 11c and 13a, the right side face 101d (see FIG. 6A) opposes the regulating surfaces 12b and 14a, and a front face 101b opposes the regulating surfaces 13b and 14b. The front face 101b, the left side face 101c and the right side face 101d of the computer 100 are in contact with or oppose the corresponding regulating surfaces with a slight clearance, so that it is possible to regulate the computer 100 on the interface device 10 at the correct position. Here, the "correct position" refers to the position of the computer 100 on the interface device 10 where the connector 16 and the interface device connector 105 can be connected to each other and the hook member 17 can engage in the security slot 106. As shown in FIG. 7A, by placing the computer 100 on the interface device 10 at the correct position, the interface device connector 105 and the hole 11a oppose each other and the security slot 106 and the hole 12a oppose each other.

Next, as shown in FIG. 7B, the slide lever 15 is displaced in the direction indicated by the arrow C from the position shown in FIG. 7A. Consequently, the connector 16 and the link bar 19 that are coupled to the slide lever 15 also are displaced in the direction indicated by the arrow C. As for the connector 16, the side on which the electric contact is provided sticks out from the hole 11a and the connector 16 is attached to the interface device connector 105 mechanically and the electric contact is connected electrically to the electric contact of the interface device connector 105.

Further, as a result of the displacement of the link bar 19 in the direction indicated by the arrow C, the end face 19h of the link bar 19 comes into contact with the side face 17a of the hook member 17 and the link bar 19 presses the hook member 17. As a result of being pressed by the link bar 19 in the direction indicated by the arrow C, the hook member 17 is rotated in the direction indicated by the arrow E about the spindle 17b. Due to the hook member 17 being rotated in the direction indicated by the arrow E, the hook 17c sticks out from the hole 12a and engages in the security slot 106.

In this way, the computer 100 and the interface device 10 can be connected to each other electrically. Further, by coupling the connector 16 and the interface device connector 105 to each other mechanically and engaging the hook member 17 in the security slot 106, it is possible to regulate the detachment of the computer 100 from the interface device 10 in the direction indicated by the arrow K.

Figure 8A:
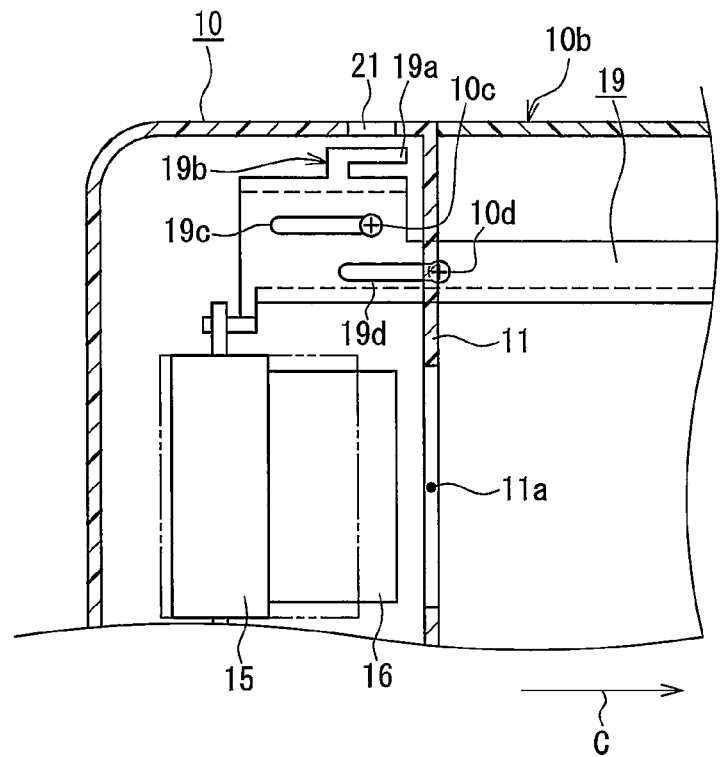
FIG. 8A is a plan view of principal components in the vicinity of a first security slot.
Figure 8B:
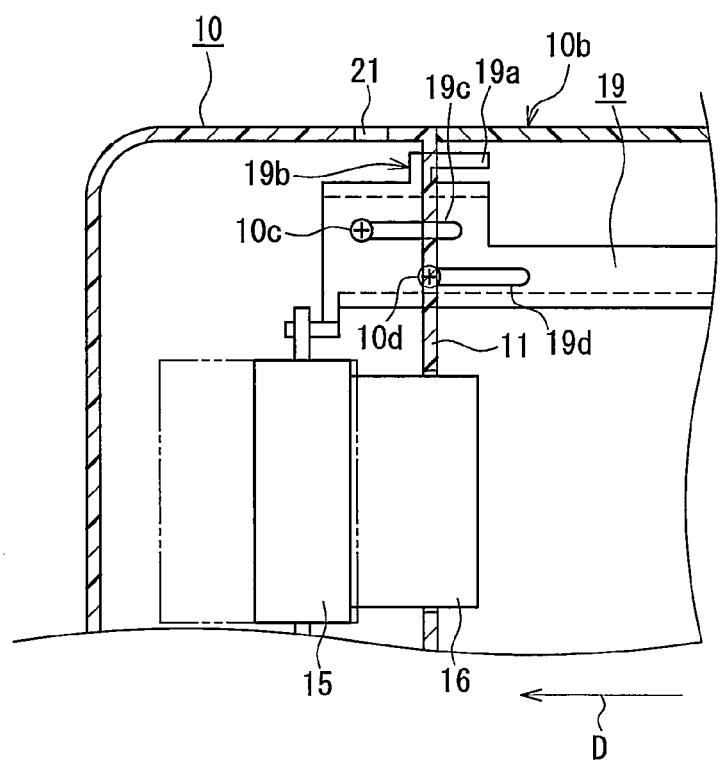
FIG. 8B is a plan view of principal components in the vicinity of the first security slot.

FIG. 8A is a cross-sectional view of principal components in the vicinity of the first security slot 21 when the interface device 10 is in the state shown in FIG. 7A. FIG. 8B is a cross-sectional view of principal components in the vicinity of the first security slot 21 when the interface device 10 is in the state shown in FIG. 7B.

As shown in FIG. 8A, when the link bar 19 is at the unlocked position, the bent portion 19a is at a position opposing the first security slot 21. In the present embodiment, since the clearance between the bent portion 19a and the first security slot 21 is small in the state shown in FIG. 8A, the security cable cannot be attached to the first security slot 21. That is, even if an attempt to attach the security cable to the first security slot 21 is made in the state as shown in FIG. 8A, since a head portion (described later) of the security cable comes into contact with the bent portion 19a, the security cable cannot be inserted into the first security slot 21.

As shown in FIG. 8B, when the link bar 19 is at the locked position, the bent portion 19a is displaced from the position opposing the first security slot 21 and is located at a position in the direction indicated by the arrow C. Therefore, the security cable can be attached to the first security slot 21. At this time, the regulating surface 19b is located in the vicinity of the first security slot 21.

Next, the security cable is attached to the first security slot 21.

Figure 9A:
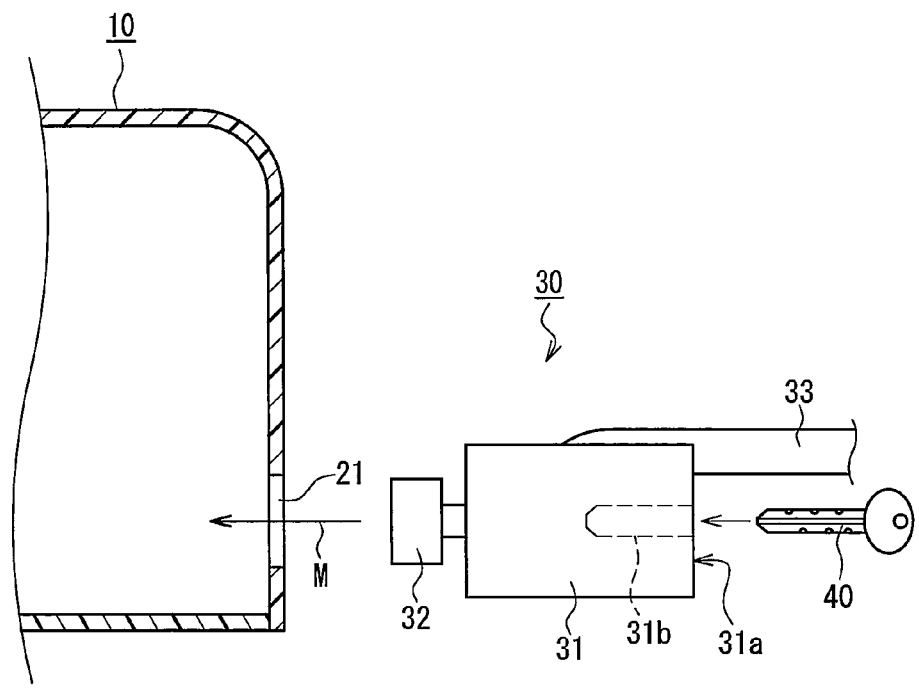
FIG. 9A is a cross-sectional view of principal components in the vicinity of the first security slot.
Figure 9B:
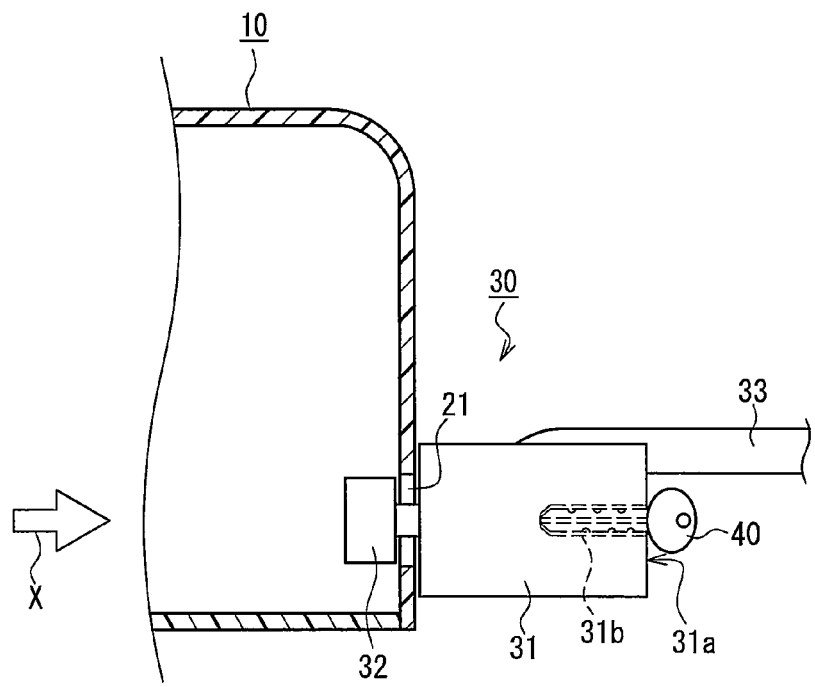
FIG. 9B is a cross-sectional view of principal components in the vicinity of the first security slot.
Figure 9C:
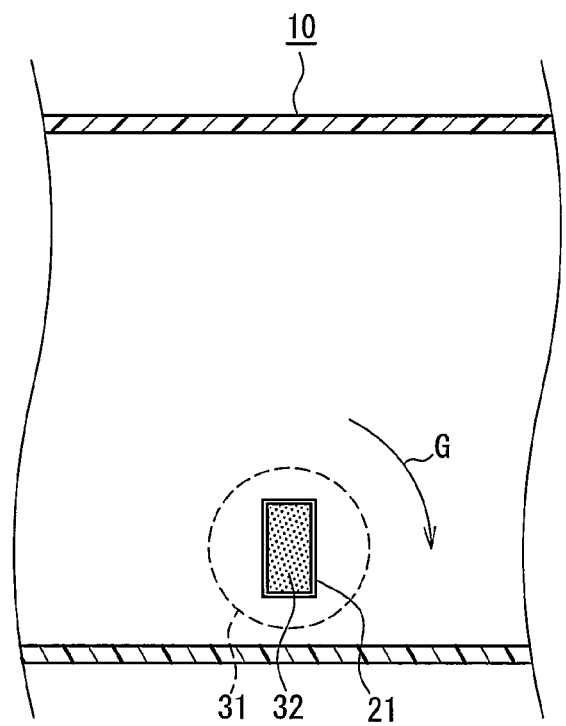
FIG. 9C is a cross-sectional view of principal components in the vicinity of the first security slot.
Figure 9D:
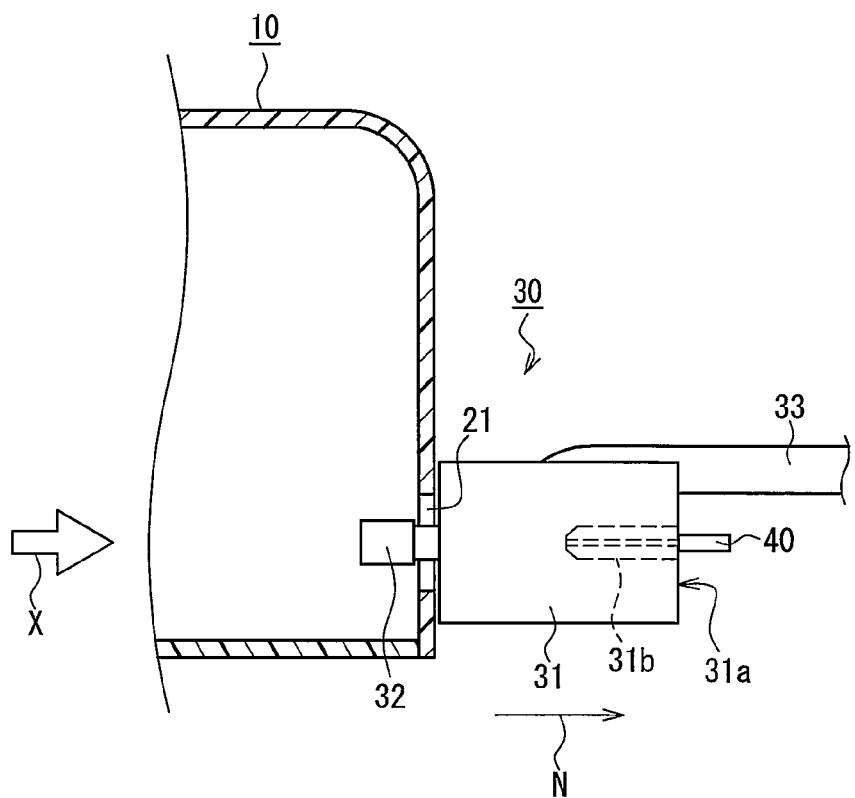
FIG. 9D is a cross-sectional view of principal components in the vicinity of the first security slot.
Figure 9E:
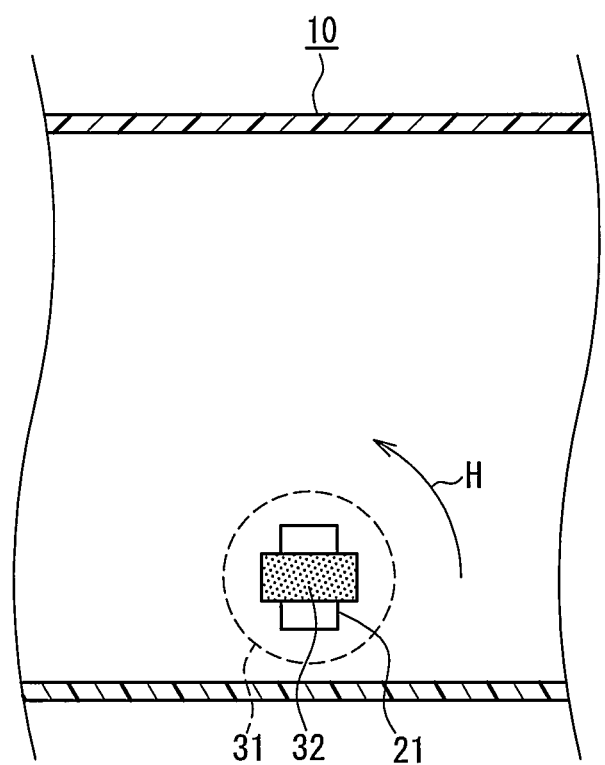
FIG. 9E is a cross-sectional view of principal components in the vicinity of the first security slot.

FIGS. 9A to 9E are cross-sectional views in transition showing an attachment operation of the security cable to the first security slot 21. For the sake of clarity, one side of the security cable 30 is illustrated in FIGS. 9A to 9E. FIGS. 9A, 9B and 9D are cross-sectional views in the vicinity of the first security slot 21 of the interface device 10 taken along the V-V portion in FIG. 3. FIG. 9C is a cross-sectional view taken along the arrow X in FIG. 9B. FIG. 9E is a cross-sectional view taken along the arrow X in FIG. 9D. FIG. 9A shows the state prior to attaching the security cable to the first security slot 21. FIGS. 9B and 9C each show a state in which the security cable is inserted in the first security slot 21. FIGS. 9D and 9E each show a state in which the security cable is attached to the first security slot 21.

A security cable 30 includes a main body 31, a head portion 32 and a cable portion 33. The main body 31 contains mechanical components required for rotating the head portion 32, and examples of the mechanical components include a spindle that rotates as a key 40 inserted in a key hole 31b formed in a side face 31a is rotated. The head portion 32 is substantially T-shaped when viewed from one side. When viewed at the angle as shown in FIG. 9C, etc, the end surface of the head portion 32 is rectangular similar to the first security slot 21 and the second security slot 22. The head portion 32 can be inserted into the first security slot 21 and the second security slot 22. By inserting the key 40 into the keyhole 31b formed in the side face 31a of the main body 31 and rotating the key 40 in the direction indicated by the arrow G in FIG. 9C, for example, the head portion 32 itself rotates. One end of the cable portion 33 is coupled to the mechanical components in the main body 31. The cable portion 33 is provided with a structure that can fix the other end of the cable portion 33 to a fixture (not shown).

When attaching the security cable to the first security slot 21, first, as shown in FIG. 9A, the key 40 is inserted into the keyhole 31b. Next, the head portion 32 is inserted into the first security slot 21. Then, as shown in FIGS. 9B and 9C, the key 40 is rotated in the direction indicated by the arrow G. For example, the rotation angle of the key 40 is set to 90° by the mechanical components in the main body 31. By rotating the key 40 in the direction indicated by the arrow G, the head portion 32 rotates by 90° in the direction indicated by the arrow G. FIGS. 9D and 9E show a state in which the head portion 32 has been rotated by 90°. Consequently, the head portion 32 and the first security slot 21 become orthogonal to each other longitudinally as shown in FIG. 9E, so that the head portion 32 becomes not removable from the first security slot 21. In other words, even if the security cable 30 is pulled in the direction indicated by the arrow N in the state shown in FIGS. 9D and 9E, since the head portion 32 comes into contact with the inner surface of the interface device 10 around the first security slot 21, the security cable 30 cannot be pulled in the direction indicted by the arrow N.

Figure 10:
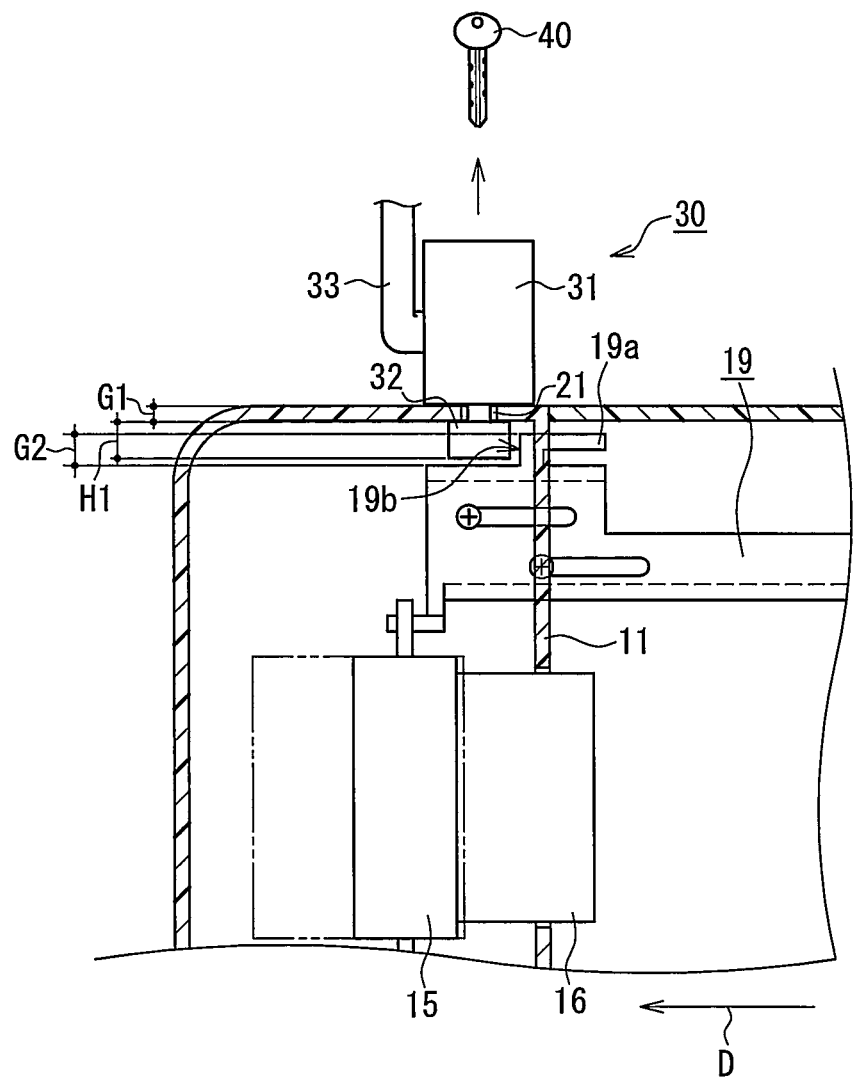
FIG. 10 is a plan view of principal components in the vicinity of the first security slot.

Next, as shown in FIG. 10, the key 40 is removed from the keyhole 31b. In this way, the attachment of the security cable 30 to the interface device 10 is completed.

The head portion 32 in the state shown in FIG. 10 is located in the vicinity of the regulating surface 19b of the link bar 19. Specifically, the head portion 32 is located on the arrow D side relative to the regulating surface 19b. Therefore, when the slide lever 15 in the state shown in FIG. 10 is displaced in the direction indicated by the arrow D, the link bar 19 is also displaced in the direction indicated by the arrow D but the regulating surface 19b comes into contact with the head portion 32 and regulates the displacement of the link bar 19 in the direction indicated by the arrow D. Because the displacement of the link bar 19 is regulated in the direction indicated by the arrow D, the link bar 19 on the end face 19h side keeps pressing the hook member 17 in the direction indicated by the arrow C and the hook 17c remains engaged in the security slot 106. Further, because the displacement of the link bar 19 in the direction indicated by the arrow D is regulated, the slide lever 15 and the connector 16 cannot be displaced in the direction indicated by the arrow D. Thus, the connector 16 remains attached to the interface device connector 105. In this way, since the hook 17c remains engaged in the security slot 106 and the connector 16 remains attached to the interface device connector 105, the computer 100 cannot be detached from the interface device 10.

By removing the security cable 30 from the first security slot 21, the link bar 19 becomes able to be displaced to the unlocked position shown in FIG. 8A from the locked position shown in FIG. 8B. As a result of displacing the link bar 19 to the position shown in FIG. 8A, the hook member 17 is disengaged from the security slot 106. Further, as a result of displacing the slide lever 15 to the position shown in FIG. 8A, the connector 16 and the interface device connector 105 are disengaged from each other. Thus, the computer 100 becomes detachable from the interface device 10.

In the present embodiment, a clearance G1 between the bent portion 19a and the first security slot 21, a width G2 of the regulating surface 19b and a width H1 of the head portion 32 in the state shown in FIG. 8A or 10 preferably have the following relationship;

$$G1 < H1 < (G1+G2).$$

That is, when the clearance G1 is too large, the head portion 32 may not be able to come into contact with the regulating surface 19b when attaching the head portion 32 to the first security slot 21. For this reason, it is preferable that G1 is less than H1 as in the present embodiment. Further, when the sum of the clearance G1 and the width G2 is larger than the width H1 of the head portion 32, there is a chance that the head portion 32 interferes with the link bar 19 beyond the regulating surface 19b, which may inhibit smooth displacement of the link bar 19. If H1, G1 and G2 have the relationship H1<(G1+G2) as in the present embodiment, the head portion 32 will not interfere with the link bar 19 beyond the regulating surface 19b, so that the link bar 19 can be displaced smoothly.

The security cable 30 can also be attached to the second security slot 22. Unlike the first security slot 21, the second security slot 22 is not configured so that the head portion 32 of the attached security cable 30 regulates the displacement of the link bar 19. In other words, even if the security cable 30 is attached to the second security slot 22, the slide lever 15, the connector 16, the hook member 17, the spring 18 and the link bar 19 become able to be displaced between the locked position and the unlocked position, so that the computer 100 becomes attachable to and detachable from the interface device 10.

[4. Effects of Embodiment, etc.]

According to the present embodiment, as a result of attaching the security cable 30 to the first security slot 21, it is possible to protect the computer 100 against theft by the connector 16 and the hook member 17 included in the interface device 10 and to protect the interface device against theft by the security cable 30. That is, by attaching the connector 16 to the interface device connector 105, engaging the hook member 17 in the security slot 106, and attaching the security cable 30 to the first security slot 21, the head portion 32 of the security cable 30 regulates the displacement of the link bar 19, and the displacement of the connector 16 and the hook member 17 can be regulated. Thus, the computer 100 and the interface device 10 can be protected against theft by a single security cable, so that they can be shifted to the locked state with ease.

Further, since the computer 100 and the interface device 10 can be protected against theft by the single security cable 30, only one key 40 is needed for locking and unlocking the security cable 30, increasing the ease of managing the key 40. On the other hand, in the configuration where security cables are connected to a computer and an interface device, respectively, two security cables and two keys are required. Thus, the management of the keys becomes complex.

Fluffier, in the state where the security cable 30 is attached to the interface device 10, the computer 100 is not detachable from the interface device 10. Therefore, it is possible to prevent accidental detachment of the interface device connector 105 from the connector 16. For example, the arrangement where security cables are attached to both a computer and an interface device to lock them involves the following problem. When a security cable is attached only to one of the computer and the interface device, the interface device connector of the computer and the connector of the interface device accidentally may be disconnected from each other. If the disconnection occurs when data is being exchanged via the interface device connector of the computer and the connector of the interface device, there is a possibility that the exchanged data is damaged. In the present embodiment, the computer 100 is attached to the interface device 10 and the security cable 30 is attached to the interface device 10. Thus, the computer 100 becomes not detachable from the interface device 10. For this reason, it is possible to prevent accidental disconnection between the interface device connector 105 of the computer 100 and the connector 16 of the interface device 10 and to prevent exchanged data from being damaged.

Further, attachment of the security cable 30 to the second security slot 22 allows only the interface device 10 to be in the theft-prevention state. As a result, a user easily can attach/detach the computer 100 to/from the interface device 10 by simply sliding the slide lever 15. Thus, in the conditions that require frequent attachment/detachment of the computer 100 to/from the interface device 10, the computer 100 can be attached to and detached from the interface device 10 quickly and easily, thereby improving the ease of operation.

Further, as the means for allowing the regulation of displacement of the link bar 19 by the security cable 30 attached to the first security slot 21, the present embodiment has used the bent portion 19a, which is formed by bending one part of the link bar 19 composed of sheet metal. As a result of such a configuration, not only can the number of steps for producing the means for regulating the displacement of the link bar 19 be reduced but also a high degree of processing precision is not required. Thus, the bent portion 19a can be produced easily. For example, as disclosed in JP H10-171552 A, the link bar includes a hole to which the head portion of the security cable can be fitted. With such a configuration, however, a high degree of precision is required for the dimensions and position of the hole. That is, the hole needs to have at least dimensions that allow the head portion of the security cable to be fitted to the hole. When there is no significant difference between the outer dimensions of the head portion and the dimensions of the hole and the relative positions of the head portion and the link bar are deviated from each other, the head portion may not be fitted to the hole. To fit the head portion to the hole even when their relative positions are deviated from each other somewhat, the dimensions of the hole may be increased. However, an increase in the dimensions of the hole leads to a decline in the stiffness of the link bar. To ensure the stiffness while having a hole with large dimensions, the thickness of the link bar may be increased. However, this leads to an increase in the cost as well as an increase in the size of the interface device. Further, the head portion may not be fitted to the hole with certainty unless the position of the hole on the link bar is highly precise. In contrast, as in the present embodiment, one advantage of using the bent portion 19a and the regulating surface 19b that are formed by bending one part of the link bar 19 is that they can be formed with somewhat rough precision regardless of the outer dimensions of the head portion 32. Further, as a result of having the bent portion 19a, the stiffness of the link bar 19 is not significantly affected. Therefore, there is no need to take measure such as increasing the thickness of the link bar 19.

In the present embodiment, although the regulating surface 19b is provided as a result of forming the bent portion 19a by bending one part of the link bar 19 composed of sheet metal, it may be formed by other methods. For example, it is possible to mold the link bar 19 so as to have shapes corresponding to the bent portion 19a and the regulating portion 19b.

Although the detachment of the computer 100 from the interface device 10 is regulated by the connector 16 and the hook member 17 in the present embodiment, the first raised portion 11 can be further provided with the same configuration as the hook member 17. As a result of such a configuration, even if the computer 100 attached to the interface device 10 is pulled in the detachment direction (the arrow K direction in FIG. 7B), the connector 16 and the interface device connector 105 are less likely to be strained. Thus, it is possible to prevent deformations of and connection failure between the electric contacts of the connector 16 and the interface device connector 105.

The interface device according to the present embodiment is an example of the peripheral device. The computer 100 according to the present embodiment is an example of the electronic device. The slide lever 15 according to the present embodiment is an example of the attachment/detachment operation portion. The first security slot 21 according to the present embodiment is an example of the first hole. The second security slot 22 according to the present embodiment is an example of the second hole. The link bar 19 according to the present embodiment is an example of the link member. The connector 16 and the hook member 17 according to the present embodiment are examples of the engagement means. The bent portion 19a and the regulating surface 19b according to the present embodiment are examples of the displacement regulating means. The security slot 106 according to the present embodiment is an example of the third hole.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An antitheft device provided for a peripheral device to/from which an electronic device can be attached/detached, the antitheft device comprising:
    a first hole to/from which a security cable can be attached/detached;
    an attachment/detachment operation portion;
    a link member that can be displaced between a first position and a second position in response to an operation of the attachment/detachment operation portion; and
    an engagement means that regulates detachment of the electronic device from the peripheral device when the link member is at the first position and does not regulate the detachment when the link member is at the second position,
    wherein the link member includes a displacement regulating means at a position where the displacement regulating means can come into contact with the security cable to regulate displacement of the link member to the second position when the security cable is attached to the first hole and the link member is at the first position.

2. The antitheft device according to claim 1, wherein the link member is composed of flat sheet metal, and the displacement regulating means can be formed by bending the sheet metal.

3. The antitheft device according to claim 1, further comprising a second hole to/from which the security cable can be attached/detached,
    wherein the second hole is formed at a position where the attached security cable does not regulate displacement of the link member.

4. The antitheft device according to claim 1, wherein the electronic device includes a third hole to/from which the security cable can be attached/detached, and the engagement means engages in the third hole to regulate detachment of the electronic device from the peripheral device.

5. An interface device attachable to and detachable from an electronic device, the interface device comprising:
    a first hole to/from which a security cable can be attached/detached;
    an attachment/detachment operation portion;
    a link member that can be displaced between a first position and a second position in response to an operation of the attachment/detachment operation portion; and
    an engagement means that regulates detachment of the electronic device from the interface device when the link member is at the first position and does not regulate the detachment when the link member is at the second position,
    wherein the link member includes a displacement regulating means at a position where the displacement regulating means can come into contact with the security cable to regulate displacement of the link member to the second position when the security cable is attached to the first hole and the link member is at the first position.

\* \* \* \* \*